(12) United States Patent
Ko et al.

(10) Patent No.: US 12,286,046 B2
(45) Date of Patent: Apr. 29, 2025

(54) SEMI-AUTOMATIC CUP HOLDER

(71) Applicant: HYUNDAI TRANSYS INC., Seosan-si (KR)

(72) Inventors: Hyun Tak Ko, Hwaseong-si (KR); Oung Han, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 18/610,306

(22) Filed: Mar. 20, 2024

(65) Prior Publication Data
US 2024/0336184 A1    Oct. 10, 2024

(30) Foreign Application Priority Data

Apr. 5, 2023    (KR) .................. 10-2023-0044662

(51) Int. Cl.
*B60N 3/10*    (2006.01)
(52) U.S. Cl.
CPC ................... *B60N 3/102* (2013.01)
(58) Field of Classification Search
CPC ....................................... B60N 3/102
USPC .......................................... 248/346.3, 311.2
See application file for complete search history.

(56) References Cited

U.S. PATENT DOCUMENTS

| | | | | |
|---|---|---|---|---|
| 4,783,037 A | * | 11/1988 | Flowerday | B60N 3/106 297/188.17 |
| 5,330,146 A | * | 7/1994 | Spykerman | B60N 3/102 224/570 |
| 5,897,089 A | * | 4/1999 | Lancaster | B60N 3/106 297/188.17 |
| 6,010,047 A | * | 1/2000 | Osborn | B60N 3/102 224/281 |

* cited by examiner

*Primary Examiner* — Anita M King
(74) *Attorney, Agent, or Firm* — Quantum Patent Law Firm; Seongyoune Kang

(57) ABSTRACT

A cup holder is disclosed. The cup holder includes a first support part and a second support part configured to accommodate a cup and rotatably disposed to assume a non-use position or a use position, a first slider configured to be movable along a given axis by rotation of the first support part, a second slider configured to be movable along the given axis by rotation of the second support part; and a link spring connected to the first slider and the second slider and configured to be rotated when the first slider and the second slider are moved along the given axis.

20 Claims, 7 Drawing Sheets

SEMI-AUTOMATIC CUP HOLDER

CROSS-REFERENCE TO RELATED APPLICATION

This application claims under 35 U.S.C. § 119 (a) the benefit of priority to Korean Patent Application No. 10-2023-0044662 filed on Apr. 5, 2023, the entire contents of which are incorporated herein by reference.

BACKGROUND

(a) Technical Field

The present disclosure relates to a semi-automatic cup holder. More particularly, it relates to a semi-automatic cup holder, movement of which is automatically completed when a user operates the same to some extent.

(b) Background Art

Generally, various convenience devices are provided in an occupant compartment of a vehicle in order to improve the convenience and comfort of a driver and a passenger. A cup holder, one of such convenience devices, is provided in various parts. For example, a cup holder is primarily mounted in a console or a center fascia in a slidable manner, or is mounted in an armrest in a slidable manner.

A cup holder configured to support a cup used by an occupant is applied both to a front seat and to a rear seat of a vehicle. A cup holder applied to a front seat is located in a console or a center fascia. Since the console and the center fascia have a relatively large thickness, it is possible to secure a sufficient depth for a structure for supporting a cup.

A cup holder applied to a rear seat is located in an armrest. In this case, however, there is a problem in that a sufficient depth for a structure for supporting a cup is not secured due to a relatively small thickness of the armrest. In particular, a sufficient vertical length of a cup holder needs to be secured in order to receive a cup. However, there is a tendency for the thickness of the armrest to decrease.

Further, when retracting the cup holder, a user has inconvenience of having to continuously apply force to the cup holder until the cup holder is fully retracted and fixed.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide a semi-automatic cup holder structured such that, when a user manually operates the cup holder over a predetermined section in order to open or close the cup holder, the cup holder is automatically moved in the remaining section so as to be opened or closed.

It is another object of the present disclosure to provide a semi-automatic cup holder structured such that a structure for supporting a cup is deployed from an armrest or a console.

In one aspect, the present disclosure provides a cup holder. The cup holder includes a first support part and a second support part configured to accommodate a cup and rotatably disposed to assume a non-use position or a use position, a first slider configured to be movable along a given axis by rotation of the first support part, a second slider configured to be movable along the given axis by rotation of the second support part; and a link spring connected to the first slider and the second slider and configured to be rotated when the first slider and the second slider are moved along the given axis, wherein the link spring is configured to be compressed as movement of the first slider and the second slider along the given axis is begun, and wherein the link spring is configured to expand after reaching a fully compressed state such that expansion of the link spring continues the movement of the first slider and the second slider along the given axis, and such that the first support part and the second support part are rotated by the expansion of the link spring to reach the use position or the non-use position.

In a preferred embodiment, as the link spring expands after being compressed, the first slider and the second slider may be moved so as to approach each other, and the first support part and the second support part are fully deployed. In another preferred embodiment, the first support part may comprise a first concave portion formed therein so as to define a cup-receiving space, wherein the second support part nay comprise a second concave portion formed therein so as to further define the cup-receiving space, and when both the first support part and the second support part are fully deployed, the first concave portion and the second concave portion may be positioned so as to face each other.

In still another preferred embodiment, the link spring may comprises a central portion provided with a rotary shaft, a first connection portion connected to the first slider, a second connection portion connected to the second slider, a first spring connecting the central portion to the first connection portion and a second spring connecting the central portion to the second connection portion. In yet another preferred embodiment, as the movement of the first slider and the second slider along the given axis is begun, the first spring and the second spring may become compressed.

In still yet another preferred embodiment, each of the first support part and the second support part may be rotatable between the non-use position and the use position, and wherein a section between the non-use position and the use position may be divided into a manual section and an automatic section.

In a further preferred embodiment, when one of the first support part and the second support part is rotated to a boundary between the manual section and the automatic section by manipulation by a user, the first slider and the second slider may be moved along the given axis such that the link spring is compressed, and wherein the first slider and the second slider may be further moved along the given axis due to an expansion of the link spring, and the first support part and the second support part may be rotated through the automatic section.

In another further preferred embodiment, the cup holder may include a slider cover configured to cover the first slider, the second slider, and the link spring, wherein the slider cover may comprise a restriction region configured to restrict a rotational range of the link spring.

In still another further preferred embodiment, the restriction region may be a region protruding from or recessed in a surface of the slider cover facing the first slider and the second slider. In yet another further preferred embodiment, the restriction region may be s defined so as to restrict rotation of the link spring to an acute angle in each of clockwise and counterclockwise directions about an axis perpendicular to the given axis.

In still yet another further preferred embodiment, the slider cover may comprise a first protruding portion and a second protruding portion protruding toward the first slider and the second slider and extending along the given axis, wherein the first protruding portion may be configured to be inserted into a first recessed portion defined in the first slider and the first slider is configured to be moved along the first protruding portion, and wherein the second protruding portion may be configured to be inserted into a second recessed portion defined in the second slider and the second slider may be configured to be moved along the second protruding portion.

In a still further preferred embodiment, the cup holder may include a body part to which the first support part and the second support part are connected, wherein the first support part and the second support part may be disposed in an inner space defined by the body part, and wherein the first slider, the second slider, and the link spring may be disposed on a sidewall of the body part defining one side of the body part.

In a yet still further preferred embodiment, the cup holder may include a first pin mounted on the first support part and extending through the sidewall of the body part and the first slider and a second pin mounted on the second support part and extending through the sidewall of the body part and the second slider, wherein a first guide portion defining a movement path of the first pin revolving in the same direction as a rotational direction of the first support part and a second guide portion defining a movement path of the second pin revolving in the same direction as a rotational direction of the second support part may be defined on the sidewall of the body part. In a yet still further preferred embodiment, the first slider may comprise a first slider guide portion defined therein, wherein the second slider may comprise a second slider guide portion defined therein, wherein, when the first pin is moved in the first guide portion, the first pin may be configured to apply force to the first slider while being moved in the first slider guide portion, whereby the first slider is moved along the given axis, and wherein, when the second pin is moved in the second guide portion, the second pin may be configured to apply force to the second slider while being moved in the second slider guide portion, whereby the second slider is moved along the given axis.

In a yet still further preferred embodiment, the first guide portion and the second guide portion may be defined so as to gradually approach respective ends of the body part in a direction from a lower portion of the body part to an upper portion of the body part, wherein the first slider guide portion and the second slider guide portion may be defined so as to become gradually farther away from respective ends of the body part in the direction from the lower portion of the body part to the upper portion of the body part, and wherein the direction from the lower portion of the body part to the upper portion of the body part may be a direction perpendicular to the given axis.

In a yet still further preferred embodiment, the link spring may comprise a rotary shaft located between a first point at which the link spring is connected to the first slider and a second point at which the link spring is connected to the second slider.

In another aspect, the present disclosure provides a cup holder assembly including a first support part and a second support part inserted into the armrest or the console and configured to be rotated in opposite directions by manipulation by a user to define a cup-receiving space, a first slider operably connected to the first support part and configured to be moved forward or backward along a given axis by rotation of the first support part, the given axis extending through the first support part and the second support part, a second slider operably connected to the second support part and configured to be moved forward or backward along the given axis by rotation of the second support part and a link spring operably connected to the first slider and the second slider and configured to be rotated when the first slider and the second slider are moved along the given axis, wherein the first support part and the second support part are fully deployed and protrude above a surface of the armrest or a surface of the console in a course in which the link spring compressed by movement of the first slider and the second slider expands.

In a preferred embodiment, the first support part and the second support part may be configured to be rotated through a manual section within which the first support part and the second support part are moved by manipulation by a user and an automatic section within which the first support part and the second support part are automatically moved through expansion of the link spring, wherein, in the manual section, a user may apply force in a given rotational direction in order to deploy the first support part and the second support part or applies force in a rotational direction opposite the opposite the given rotational direction in order to store the first support part and the second support part, and wherein, when the first support part and the second support part are moved beyond a boundary between the manual section and the automatic section by manipulation by a user, the first support part and the second support part may become fully deployed or fully retracted from expansion of the link spring.

In another preferred embodiment, the boundary between the manual section and the automatic section may correspond to a state in which a reference axis interconnecting points at which the link spring is connected to the first slider and the second slider is oriented in a direction perpendicular to the given axis.

In still another preferred embodiment, the cup holder may include a body part configured to form a space into which the first support part and the second support part are inserted and a slider cover configured to cover the first slider, the second slider, and the link spring disposed on a sidewall of the body part corresponding to one side of the body part, wherein the slider cover may comprise a restriction region configured to restrict a rotational range of the link spring.

Other aspects and preferred embodiments of the disclosure are discussed infra.

It is understood that the term "vehicle" or "vehicular" or other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
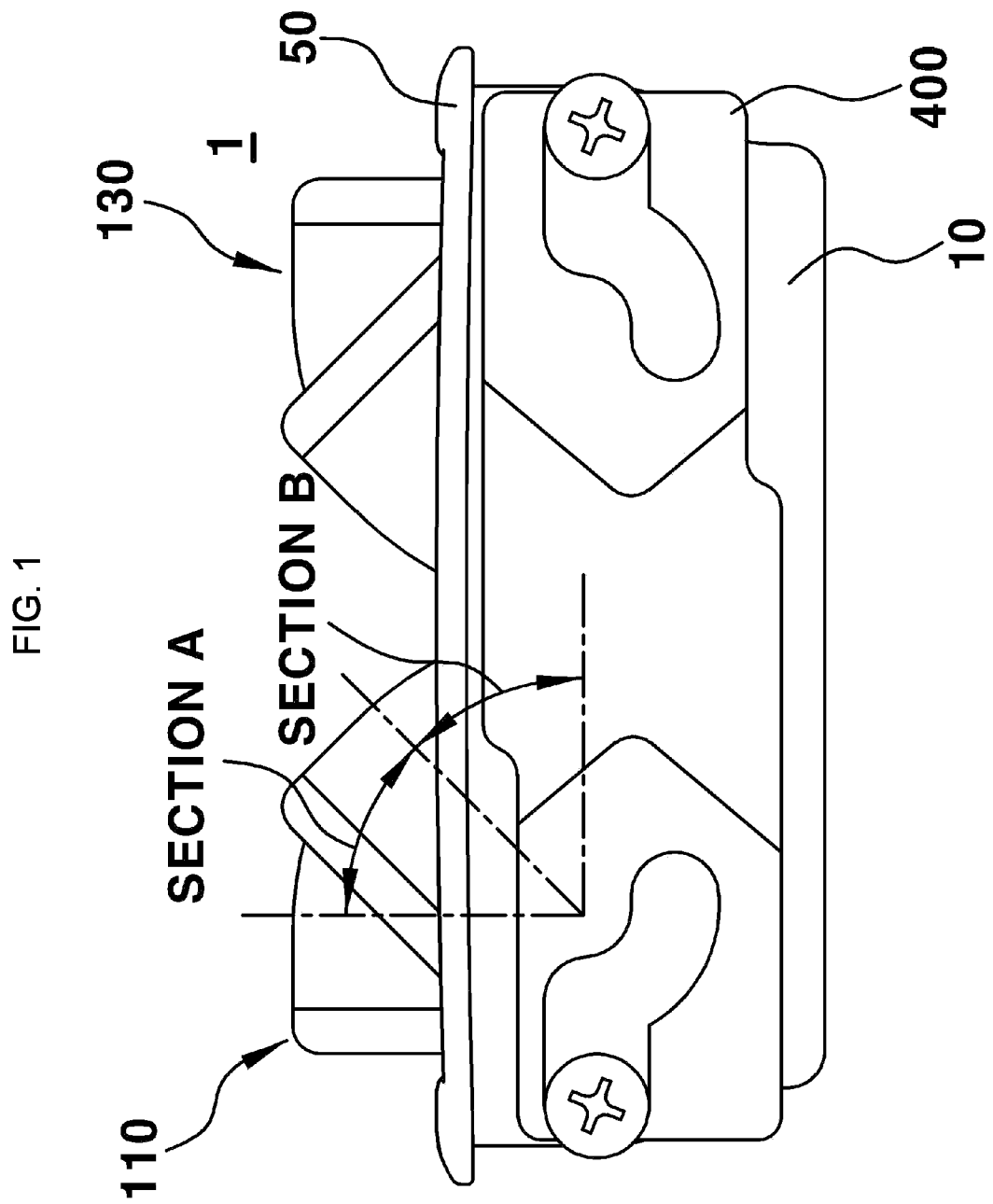
FIG. 1 is a view for explaining a manual section and an automatic section of a semi-automatic cup holder according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Advantages and features of the present disclosure and methods for achieving the same will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. Throughout the specification, the same reference numerals represent the same components.

Additionally, terms such as "first", "second", etc. may be used herein to describe the components of the embodiments. These terms are only used to distinguish one element from another element, and the essence, order, or sequence of corresponding elements is not limited by these terms.

The detailed description is illustrative of the present disclosure. Also, the above description is intended to illustrate and explain preferred embodiments of the present disclosure, and the present disclosure may be implemented in various other combinations, modifications, and environments. In other words, the present disclosure may be changed or modified within the scope of the concept of the disclosure disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the detailed description is not intended to limit the present disclosure to the embodiments. Also, the appended claims should be construed as encompassing such other embodiments.

Figure 2:
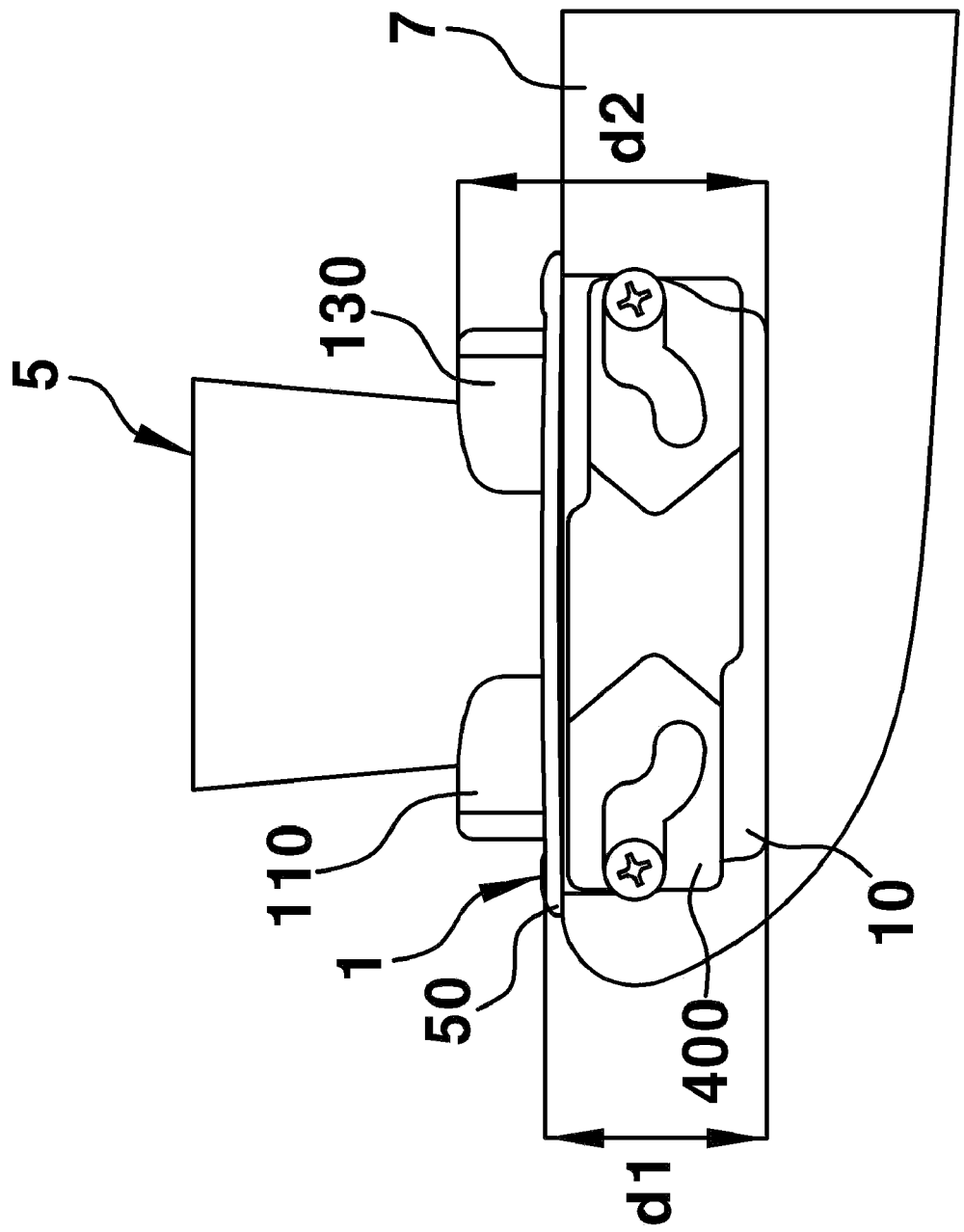
FIG. 2 is a view for explaining the semi-automatic cup holder applied to an armrest according to the embodiment of the present disclosure.

FIG. 1 is a view for explaining a manual section and an automatic section of a semi-automatic cup holder according to an embodiment of the present disclosure, and FIG. 2 is a view for explaining the semi-automatic cup holder applied to an armrest according to the embodiment of the present disclosure.

Referring to FIGS. 1 and 2, a semi-automatic cup holder 1 may be mounted in an armrest 7 or a console (not shown) of a vehicle. The semi-automatic cup holder 1 may include a first support part 110 and a second support part 130 configured to support a cup 5. When any one of the first support part 110 and the second support part 130 is manipulated by a user to be rotated, the first support part 110 and the second support part 130 may be fully deployed. When the first support part 110 and the second support part 130 are fully deployed, the cup 5 may be supported by and received in the first support part 110 and the second support part 130.

The first support part 110 and the second support part 130 may be configured to be rotatable between a use position capable of supporting and receiving the cup 5 and a non-use position incapable of supporting or receiving the cup 5. When located at the non-use position, neither the first support part 110 nor the second support part 130 may protrude above the armrest 7 or the console. In other words, a state in which the first support part 110 and the second support part 130 are disposed in a body part 10 may be a state in which the semi-automatic cup holder 1 is not in use. The body part 10 may define an inner space in which the first support part 110 and the second support part 130 are disposed and received. When the first support part 110 and the second support part 130 are located at the use position, the cup 5 may be placed between the first support part 110 and the second support part 130. When located at the use position, the first support part 110 and the second support part 130 may protrude above the surface of the armrest 7 or the surface of the console. A border part 50 defining the border of the semi-automatic cup holder 1 may be disposed on the surface of the armrest 7 or the surface of the console, and the first support part 110 and the second support part 130 may protrude above the border part 50 disposed on the surface of the armrest 7 or the surface of the console.

When the first support part 110 and the second support part 130 are located at the non-use position, the thickness of the semi-automatic cup holder 1 may be a first thickness d1. The first thickness d1 of the semi-automatic cup holder 1 may be a length from the border part 50 to the end of the body part 10. When the first support part 110 and the second support part 130 are located at the use position, the thickness of the semi-automatic cup holder 1 may be a second thickness d2. The second thickness d2 of the semi-automatic cup holder 1 may be a length from the end of the first support part 110 or the second support part 130 to the end of the body part 10. For example, the second thickness d2 may be larger than the first thickness d1. Since the semi-automatic cup holder 1 according to the embodiment of the present disclosure employs a structure in which the first support part 110 and the second support part 130 are deployed only when supporting the cup 5, the semi-automatic cup holder 1 may be applied to the armrest 7 having a small thickness. Further, a sufficient depth of a space in which the cup 5 is received may be secured by the first support part 110 and the second support part 130 that are deployed, whereby the cup 5 may be stably supported.

A section between the non-use position and the use position may be divided into two sections. The two sections may include a manual section and an automatic section. When the first support part 110 and the second support part 130 are rotated from the non-use position to the use position, section B shown in FIG. 1 may be the manual section, and section A shown in FIG. 1 may be the automatic section. When the first support part 110 and the second support part 130 are rotated from the use position to the non-use position, section A may be the manual section, and section B may be the automatic section. The manual section may be a section within which the first support part 110 or the second support part 130 is rotated by manipulation by the user. The automatic section may be a section within which the first support part 110 or the second support part 130 is automatically rotated without manipulation by the user. The first support part 110 and the second support part 130 that have passed through the automatic section may be in a fully deployed state or may be in a state of being fully retracted into the body part 10. When the user rotates any one of the first support part 110 and the second support part 130 to a predetermined point beyond a boundary between the manual section and the automatic section, the first support part 110 and the second support part 130 may be rotated along the automatic section.

According to the embodiment of the present disclosure, when the user rotates any one of the first support part 110 and the second support part 130 along the manual section, the first support part 110 and the second support part 130 may continue to be rotated along the automatic section, with a result that the semi-automatic cup holder 1 may enter a state capable of receiving the cup 5. Therefore, the user may move the semi-automatic cup holder 1 to the use position with little force.

According to the embodiment of the present disclosure, the semi-automatic cup holder 1 may be manufactured to have a relatively small thickness, and accordingly, may be applied to the armrest 7 having a small thickness. In addition, due to rotation of the first support part 110 and the second support part 130, a sufficient vertical length of the space for supporting the cup 5 may be secured.

Figure 3:
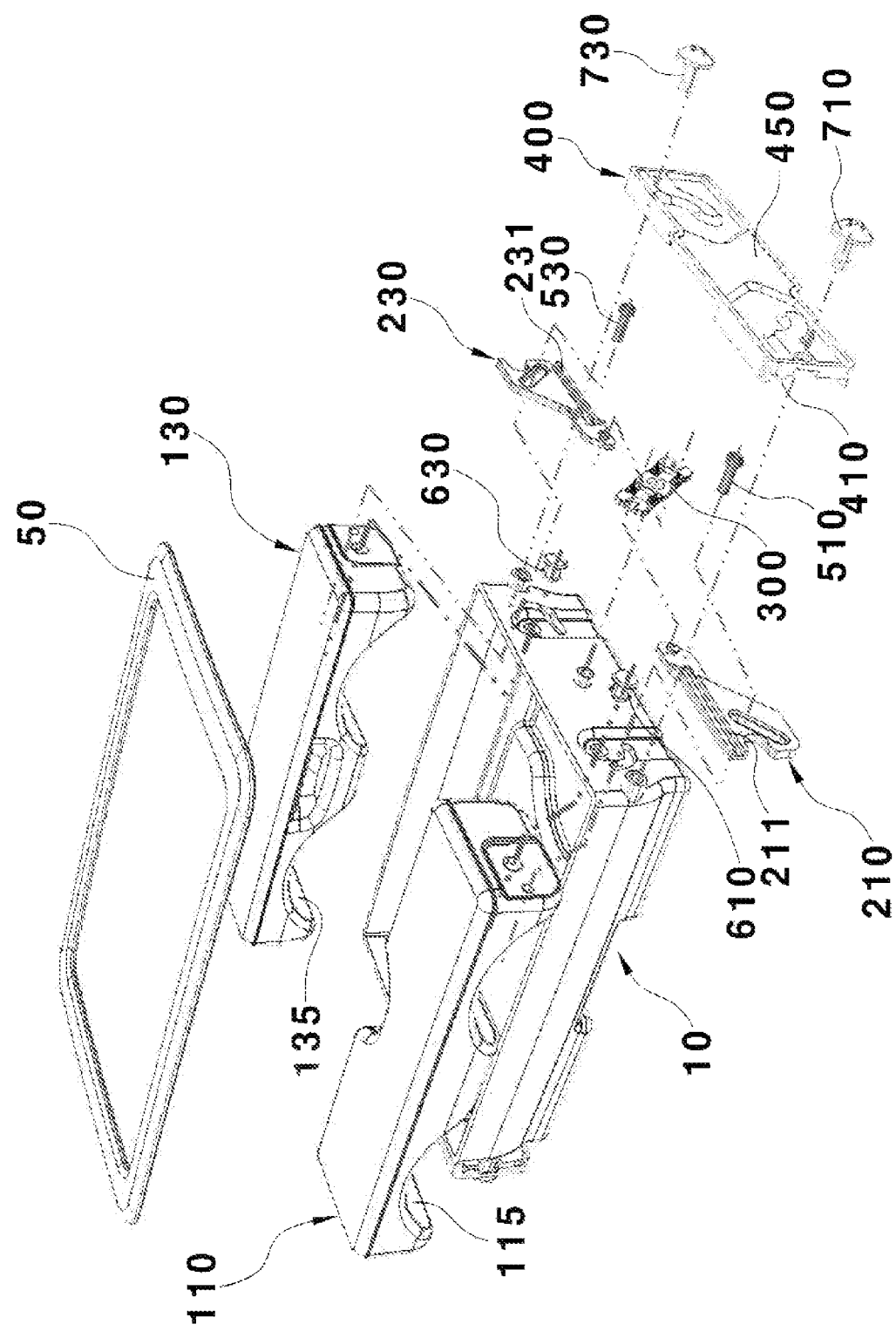
FIG. 3 is an exploded perspective view of the semi-automatic cup holder according to the embodiment of the present disclosure.
Figure 4:
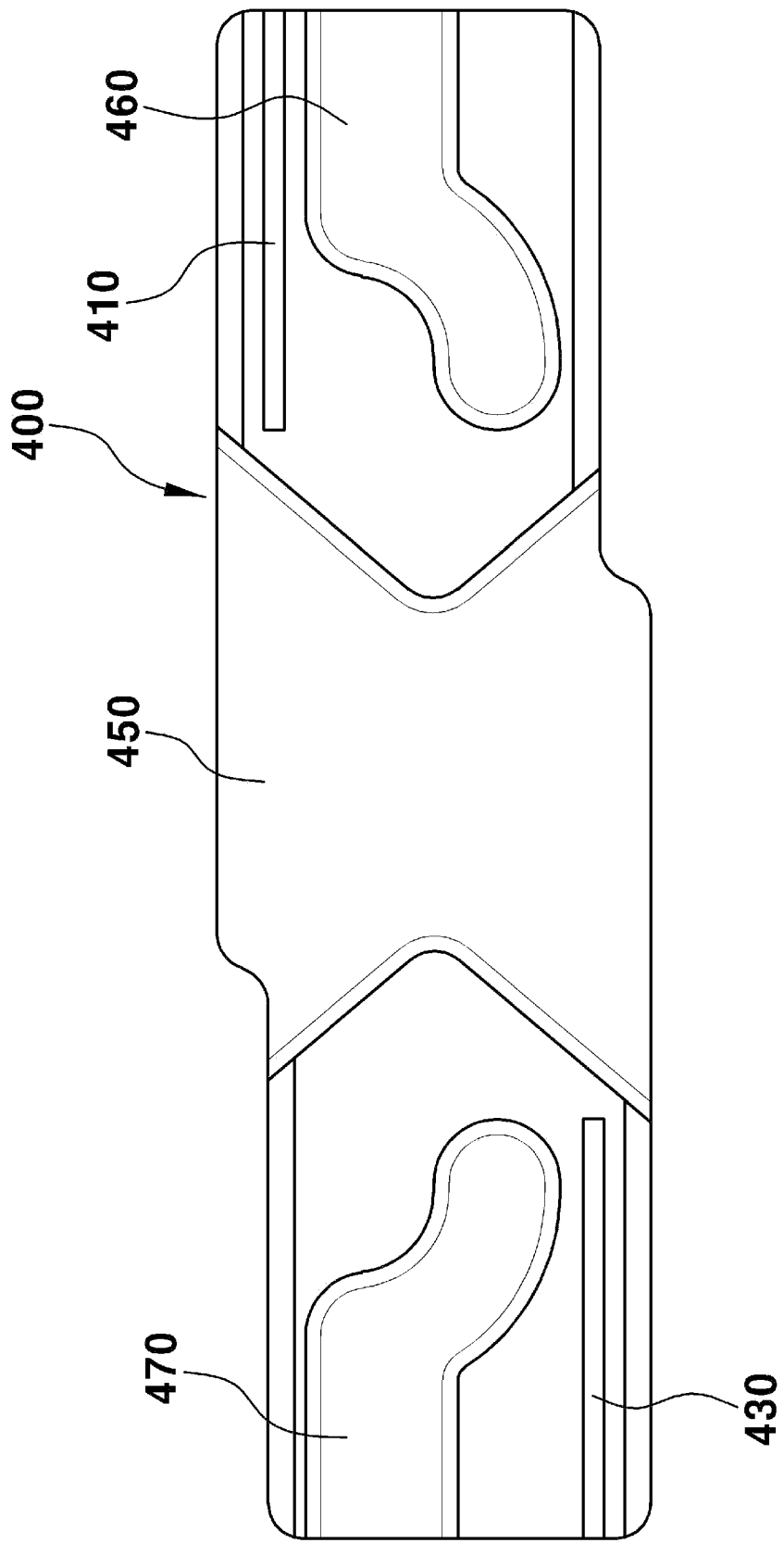
FIG. 4 is a view of a slider cover according to an embodiment of the present disclosure.

FIG. 3 is an exploded perspective view of the semi-automatic cup holder according to the embodiment of the present disclosure, and FIG. 4 is a view of a slider cover according to an embodiment of the present disclosure.

Referring to FIGS. 3 and 4, the semi-automatic cup holder 1 may include a body part 10, support parts 110 and 130, sliders 210 and 230, a link spring 300, and a slider cover 400. The support parts 110 and 130 may be disposed in an inner space defined by the body part 10. The sliders 210 and 230, the link spring 300, and the slider cover 400 may be disposed on a sidewall of the body part 10 defining one side of the body part 10. The slider cover 400 may be disposed so as to cover the sliders 210 and 230 and the link spring 300. That is, the deployment structure of the semi-automatic cup holder 1, which includes the sliders 210 and 230 and the link spring 300, may be sealed by the sidewall of the body part 10 defining one side of the body part 10 and the slider cover 400.

The support parts 110 and 130 may include a first support part 110 and a second support part 130. A state in which the first support part 110 and the second support part 130 are located at the non-use position may be a state in which the first support part 110 and the second support part 130 are located in the inner space defined by the body part 10. A state in which the first support part 110 and the second support part 130 are located at the use position may be a state in which the first support part 110 and the second support part 130 are rotated out of the inner space defined by the body part 10 so as to protrude above the border part 50. The user may rotate the first support part 110 or the second support part 130 using a grip (not shown) provided at the first support part 110 or the second support part 130. The first support part 110 may be rotatably connected to the body part 10 via a first rotary shaft 610, and the second support part 130 may be rotatably connected to the body part 10 via a second rotary shaft 630. The first rotary shaft 610 and the second rotary shaft 630 may be located at two opposite ends of the body part 10 in a direction oriented from the first support part 110 to the second support part 130. The first support part 110 and the second support part 130 may be rotated about the first rotary shaft 610 and the second rotary shaft 630, respectively, in opposite directions. When the first support part 110 and the second support part 130 are fully rotated to the use position, a space capable of receiving the cup may be defined between the first support part 110 and the second support part 130.

The first support part 110 and the second support part 130 may include concave portions 115 and 135 formed therein so as to hold the cup when the first support part 110 and the second support part 130 are located at the use position. The concave portions 115 and 135 may include a first concave portion 115 formed in the first support part 110 and a second concave portion 135 formed in the second support part 130. When the first support part 110 and the second support part 130 are fully deployed, the first concave portion 115 and the second concave portion 135 may be located so as to face each other. Therefore, the cup may be received between the first concave portion 115 and the second concave portion 135.

The border part 50 may be disposed on the border of the body part 10. The border part 50 may be shaped to surround the peripheries of the first and second support parts 110 and 130.

The sliders 210 and 230 may include a first slider 210 and a second slider 230. The first slider 210 may operate in engagement with the first support part 110, and the second slider 230 may operate in engagement with the second support part 130. The first slider 210 may be moved along a given axis when the first support part 110 is rotated. The second slider 230 may be moved along the given axis when the second support part 130 is rotated. When the first support part 110 and the second support part 130 are moved from the non-use position to the use position, the first slider 210 and the second slider 230 may be moved close to each other. On the other hand, when the first support part 110 and the second support part 130 are moved from the use position to the non-use position, the first slider 210 and the second slider 230 may be moved away from each other. That is, the first slider 210 and the second slider 230 may be moved forward or backward along the given axis.

The first slider 210 and the second slider 230 may be operated in engagement with the body part 10 and the support parts 110 and 130 by means of pins 510 and 530. The pins 510 and 530 may include a first pin 510 penetrating the first slider 210 and a second pin 530 penetrating the second slider 230. The first pin 510 may be connected to the first support part 110 so as to be revolved along with rotation of the first support part 110 about the first rotary shaft 610. The second pin 530 may be connected to the second support part 130 so as to be revolved along with rotation of the second support part 130 about the second rotary shaft 630. The first pin 510 may be spaced apart from the first rotary shaft 610, and the second pin 530 may be spaced apart from the second rotary shaft 630. Therefore, when the first support part 110 is rotated, the first pin 510 may be moved along a first slider guide portion defined in the first slider 210, and may push the first slider 210 along the given axis while moving along the first slider guide portion. In addition, when the second support part 130 is rotated, the second pin 530 may be moved along a second slider guide portion defined in the second slider 230, and may push the second slider 230 along the given axis while moving along the second slider guide portion.

The first slider 210 may be moved in one direction along a first protruding portion 410 provided on the slider cover 400. The first slider 210 may include a first recessed portion 211 defined therein so as to be coupled to the first protruding portion 410. The first protruding portion 410 may be inserted into the first recessed portion 211. The second slider 230 may be moved in one direction along a second protruding portion 430 provided on the slider cover 400. The second slider 230 may include a second recessed portion 231 defined therein so as to be coupled to the second protruding portion 430. The second protruding portion 430 may be inserted into the second recessed portion 231. The first protruding portion 410 may be disposed at a higher position than the second protruding portion 430 in a direction perpendicular to the direction in which the first slider 210 and the second slider 230 are moved. In addition, the first recessed portion 211 may be disposed at a higher position than the second recessed portion 231 in a direction perpendicular to the direction in which the first slider 210 and the second slider 230 are moved.

A portion of the first slider 210 and a portion of the second slider 230, which are connected to the link spring 300, may extend toward each other. A portion of the first slider 210 may extend toward the second slider 230 and may be connected to one end of the link spring 300. A portion of the second slider 230 may extend toward the first slider 210 and may be connected to the other end of the link spring 300. The portion of the first slider 210 may be disposed at a higher position than the portion of the second slider 230, and a rotary shaft of the link spring 300 may be located between the portion of the first slider 210 and the portion of the second slider 230.

The link spring 300 may be connected to the first slider 210 and the second slider 230 to continuously provide moving force in the direction in which the first slider 210 and the second slider 230 are moved by manipulation by the user. The link spring 300 may be connected to the first slider 210 and the second slider 230 to be rotated when the first slider 210 and the second slider 230 are moved along the given axis. The link spring 300 may be rotated about an axis that is perpendicular to the direction in which the first slider 210 and the second slider 230 are moved and extends in a direction in which the slider cover 400 faces the first slider 210 and the second slider 230. The link spring 300 may be compressed when the first slider 210 and the second slider 230 are moved along the given axis, and the first support part 110 and the second support part 130 may be rotated when the compressed link spring 300 expands.

The slider cover 400 may include the first protruding portion 410 inserted into the first recessed portion 211 defined in the first slider 210, the second protruding portion 430 inserted into the second recessed portion 231 defined in the second slider 230, and a restriction region 450 formed so as to restrict a rotational range of the link spring 300. The restriction region 450 may be a region protruding from or recessed in a surface of the slider cover 400 that faces the first slider 210 and the second slider 230. That is, the restriction region 450 may be a specific region defined on the surface of the slider cover 400. The restriction region 450 may be defined so as to allow the link spring 300 to be rotated to an acute angle in each of the clockwise and counterclockwise directions about an axis perpendicular to the direction in which the first slider 210 and the second slider 230 are moved. A portion or an entirety of the link spring 300 may be located in the restriction region 450. Since the restriction region 450 restricts the rotational range of the link spring 300, the first slider 210 and the second slider 230 may be prevented from being damaged due to contact with each other, or the first and second sliders 210 and 230 and the slider cover 400 may be prevented from being damaged due to contact with each other.

The slider cover 400 may include a first movement region 460 and a second movement region 470 recessed therein in order to avoid interference between a section within which the first pin 510 is moved and a section within which the second pin 530 is moved. The first pin 510 may be revolved in the same direction as the rotational direction of the first support part 110, and the second pin 530 may be revolved in the same direction as the rotational direction of the second support part 130. The first pin 510 and the second pin 530 may be revolved along curved guide portions (not shown) defined in one side of the body part 10, and the first movement region 460 and the second movement region 470 may be defined in the slider cover 400 in order to prevent damage to the slider cover 400 due to rotation of the first pin 510 and the second pin 530.

Both ends of the slider cover 400 may be connected to the body part 10 via bolts 710 and 730. The sliders 210 and 230, the link spring 300, the pins 510 and 530, and the rotary shafts 610 and 630 may not be exposed by the body part 10 and the slider cover 400.

Figure 5:
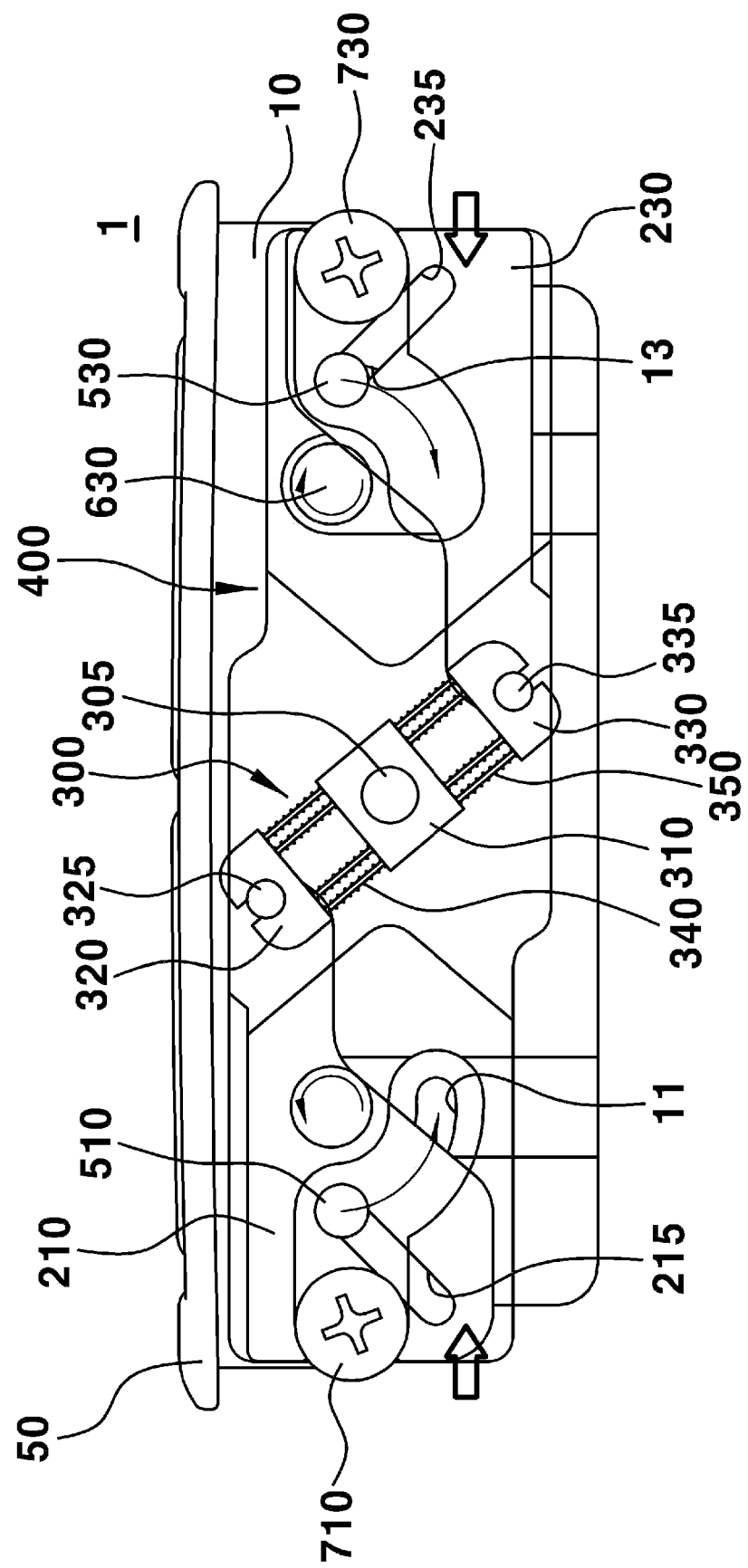
FIGS. 5 to 7 are views for explaining a process in which the semi-automatic cup holder according to the embodiment of the present disclosure is fully deployed.
Figure 6:
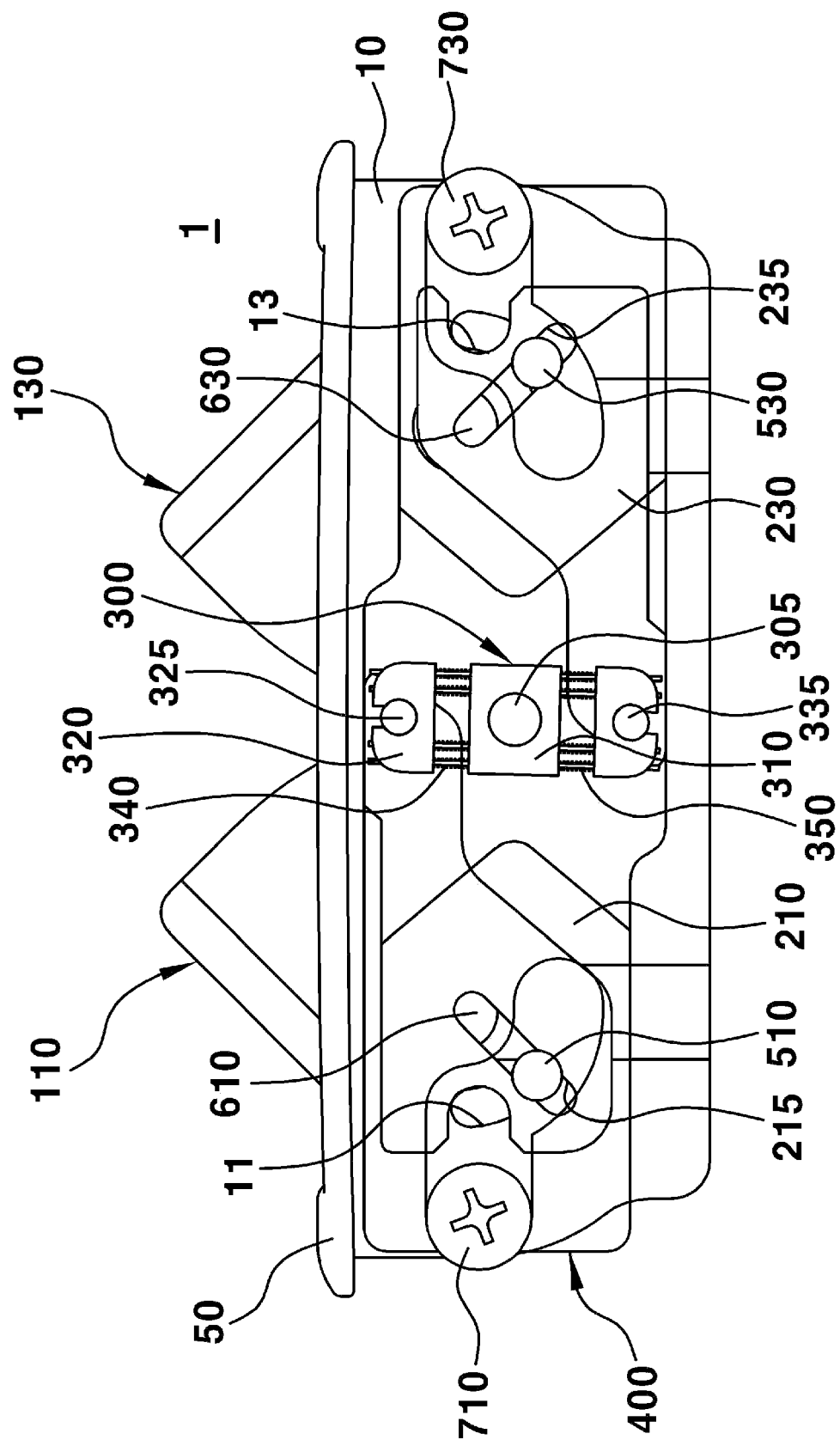
Figure 7:
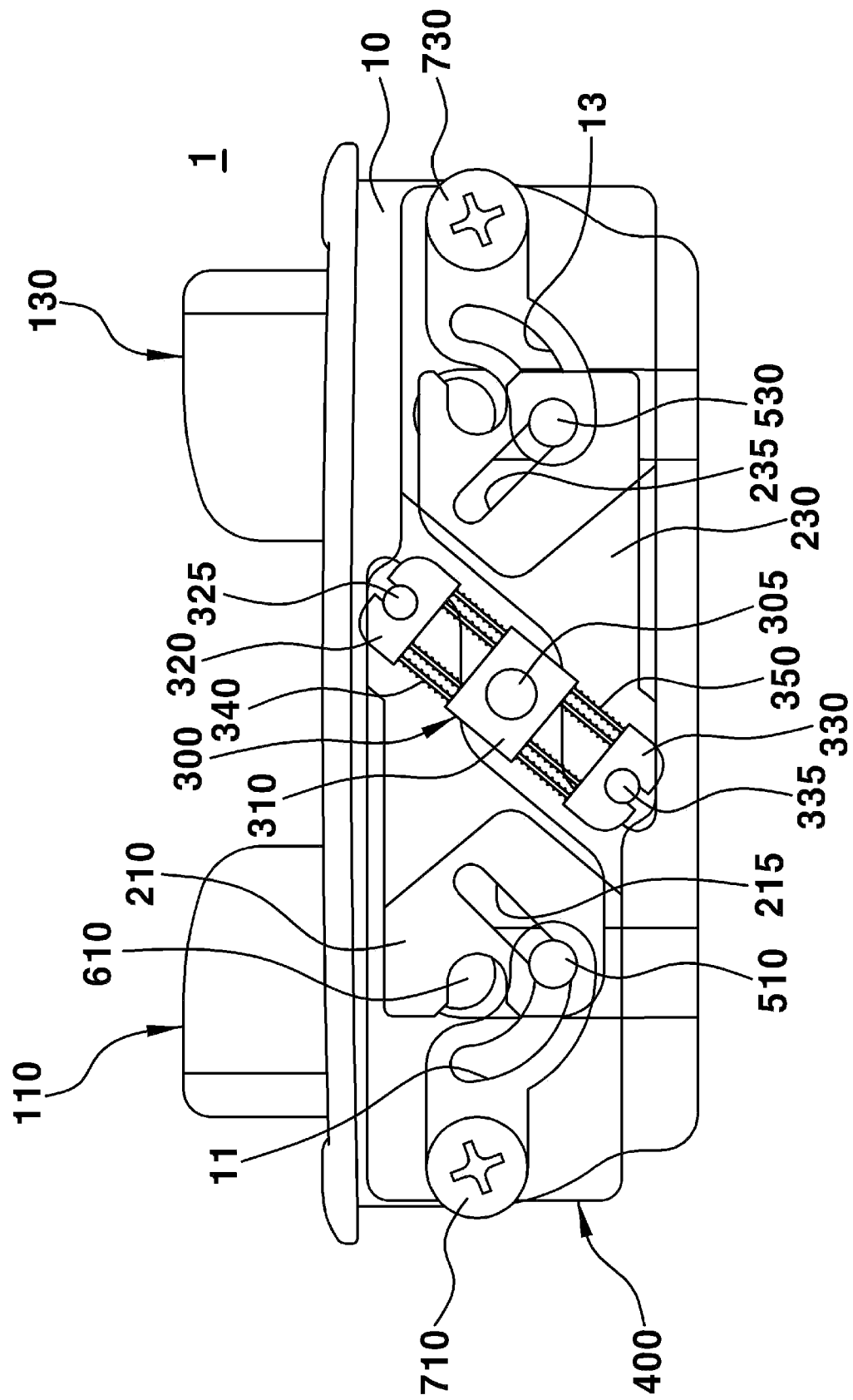

FIGS. 5 to 7 are views for explaining a process in which the semi-automatic cup holder according to the embodiment of the present disclosure is fully deployed. FIG. 5 shows the non-use state of the semi-automatic cup holder, FIG. 6 shows a boundary state between the non-use state and the use state of the semi-automatic cup holder, and FIG. 7 shows the use state of the semi-automatic cup holder.

Referring to FIGS. 3 and 5, the link spring 300 may include a central portion 310 provided with a rotary shaft 305, a first connection portion 320 connected to the first slider 210, a second connection portion 330 connected to the second slider 230, a first spring 340 connecting the central portion 310 to the first connection portion 320, and a second spring 350 connecting the central portion 310 to the second connection portion 330. The rotary shaft 305 may be located between a first point 325 at which the first connection portion 320 is connected to the first slider 210 and a second point 335 at which the second connection portion 330 is connected to the second slider 230.

The body part 10 may include a first guide portion 11 and a second guide portion 13 defined in the sidewall thereof defining one side thereof so as to respectively guide the first pin 510 and the second pin 530 to move therealong. The first pin 510 may be moved along the first guide portion 11 while being rotated in the same direction as the rotational direction of the first support part 110. The second pin 530 may be moved along the second guide portion 13 while being rotated in the same direction as the rotational direction of the second support part 130. The first guide portion 11 and the second guide portion 13 may be defined so as to gradually approach respective ends of the body part 10 in a direction from the lower portion of the body part 10 to the upper portion of the body part 10. In other words, the first guide portion 11 and the second guide portion 13 may be empty spaces defining paths along which the first pin 510 and the second pin 530 are moved, and may be inclined so as to gradually approach respective ends of the body part 10 in a direction from the lower portion of the body part 10 to the upper portion of the body part 10. The direction from the lower portion of the body part 10 to the upper portion of the body part 10 may be a direction perpendicular to the direction in which the first slider 210 and the second slider 230 are moved.

The first slider 210 may include a first slider guide portion 215 defined therein, and the second slider 230 may include a second slider guide portion 235 defined therein. When the first pin 510 is moved in the first guide portion 11, the first pin 510 may apply force to the first slider 210 while being moved in the first slider guide portion 215, whereby the first slider 210 may be moved along the given axis. The arrows in FIG. 5 or extensions thereof may be example embodiments of the axis along which the first slider and the second slider may move. When the second pin 530 is moved in the second guide portion 13, the second pin 530 may apply force to the second slider 230 while being moved in the second slider guide portion 235, whereby the second slider 230 may be moved along the given axis. The first slider guide portion 215 and the second slider guide portion 235 may be defined so as to become gradually farther away from respective ends of the body part 10 in the direction from the lower portion of the body part 10 to the upper portion of the body part 10.

The first pin 510 may be mounted on the first support part 110 and may penetrate the sidewall of the body part 10 and the first slider 210. The second pin 530 may be mounted on the second support part 130 and may penetrate the sidewall of the body part 10 and the second slider 230. In detail, the first pin 510 may penetrate the first guide portion 11 and the first slider guide portion 215, and the second pin 530 may penetrate the second guide portion 13 and the second slider guide portion 235. The first guide portion 11 and the first slider guide portion 215 may be formed to extend in different directions along the direction perpendicular to the direction in which the first slider 210 and the second slider 230 are moved, whereby the first pin 510 may apply force to the first slider 210 when moved in the first guide portion 11. The second guide portion 13 and the second slider guide portion 235 may be formed to extend in different directions along the direction perpendicular to the direction in which the first slider 210 and the second slider 230 are moved, whereby the second pin 530 may apply force to the second slider 230 when moved in the second guide portion 13.

When the semi-automatic cup holder 1 is not in use, the first support part 110 and the second support part 130 may be in a state of being stored in the body part 10. The first slider 210 and the second slider 230 may be located so as to be spaced farthest from each other. The first pin 510 and the second pin 530 may be located at the tops of the first guide portion 11 and the second guide portion 13 and may be located at the tops of the first slider guide portion 215 and the second slider guide portion 235. A reference axis interconnecting the first point 325 and the second point 335 may form an acute angle with the direction perpendicular to the direction in which the first slider 210 and the second slider 230 are moved.

Referring to FIG. 6, since the first support part 110 and the second support part 130 are connected to the first slider 210 and the second slider 230 and the first slider 210 and the second slider 230 are connected to each other via the link spring 300, when the user manipulates any one of the first support part 110 and the second support part 130, the remaining unmanipulated one of the first support part 110 and the second support part 130 may also be rotated.

When the user manipulates any one of the first support part 110 and the second support part 130 to the boundary between the manual section and the automatic section, the link spring 300 may be fully compressed to the maximum extent. In detail, the first spring 340 and the second spring 350 may be fully compressed to the maximum extent. In this case, the maximum extent may be the maximum extent to which the link spring 300 can be compressed in the course of opening and closing of the semi-automatic cup holder 1, rather than the maximum value in the inherent compression range of the spring. The boundary between the manual section and the automatic section may correspond to a state in which the reference axis interconnecting the first point 325 and the second point 335 is oriented in the direction perpendicular to the direction in which the first slider 210 and the second slider 230 are moved. In this state, when the user manipulates any one of the first support part 110 and the second support part 130 to a point beyond the boundary between the manual section and the automatic section, the first support part 110 and the second support part 130 may continue to be rotated by the expansion force of the link spring 300 even when the user does not manipulate the same any more.

When the user manipulates any one of the first support part 110 and the second support part 130 so that the first support part 110 and the second support part 130 are moved from the non-use position to the use position, the first pin 510 and the second pin 530 may be moved from the upper portions of the first guide portion 11 and the second guide portion 13 toward the lower portions of the first guide portion 11 and the second guide portion 13. In addition, the first pin 510 and the second pin 530 may be moved from the upper portions of the first slider guide portion 215 and the second slider guide portion 235 toward the lower portions of the first slider guide portion 215 and the second slider guide portion 235. In this course, the first pin 510 may push the first slider 210 in one direction, and the second pin 530 may push the second slider 230 in one direction. Therefore, the first slider 210 and the second slider 230 may be moved close to each other.

On the other hand, when the user manipulates any one of the first support part 110 and the second support part 130 so that the first support part 110 and the second support part 130 are moved from the use position to the non-use position, the first pin 510 and the second pin 530 may be moved from the lower portions of the first guide portion 11 and the second guide portion 13 toward the upper portions of the first guide portion 11 and the second guide portion 13. In addition, the first pin 510 and the second pin 530 may be moved from the lower portions of the first slider guide portion 215 and the second slider guide portion 235 toward the upper portions of the first slider guide portion 215 and the second slider guide portion 235. In this course, the first pin 510 may push the first slider 210 in one direction, and the second pin 530 may push the second slider 230 in one direction. Therefore, the first slider 210 and the second slider 230 may be moved far away from each other.

Referring to FIG. 7, when the user manipulates the first support part 110 or the second support part 130 to a point beyond the boundary between the manual section and the automatic section, the first support part 110 and the second support part 130 may be automatically rotated in the course in which the link spring 300 compressed to the maximum extent expands. That is, even when there is no manipulation by the user, the first support part 110 and the second support part 130 may be automatically rotated by expansion of the link spring 300. The manual section may be a section within which the user manipulates the fully deployed first support part 110 or second support part 130 until the link spring 300 is compressed to the maximum extent or a section within which the user manipulates the first support part 110 or the second support part 130 stored in the body part 10 until the link spring 300 is compressed to the maximum extent. The automatic section may be a section within which the first support part 110 and the second support part 130 are automatically rotated by the expansion force of the link spring 300 compressed to the maximum extent. That is, the section within which the user applies force in a first rotational direction in order to deploy the first support part 110 and the second support part 130 or applies force in a second rotational direction opposite the first rotational direction in order to store the first support part 110 and the second support part 130 may be defined as the manual section.

In the course of expanding, the link spring 300 may be rotated in the same direction as the previous rotational direction thereof. The first slider 210 and the second slider 230 may be continuously moved by expansion of the link spring 300. In the use state of the semi-automatic cup holder 1, the first slider 210 and the second slider 230 may be located closest to each other. The first pin 510 and the second pin 530 may be located at the bottoms of the first guide portion 11 and the second guide portion 13 and may be located at the bottoms of the first slider guide portion 215 and the second slider guide portion 235. The reference axis interconnecting the first point 325 and the second point 335 may form an acute angle with the direction perpendicular to the direction in which the first slider 210 and the second slider 230 are moved. However, the reference axis may be located at a position different from that in the non-use state of the semi-automatic cup holder 1. The link spring 300 may be restricted in rotational range by the restriction region 450 defined in the slider cover 400, and the first support part 110 and the second support part 130 may be fully deployed at a point at which the rotational range of the link spring 300 is restricted. In the state in which the first support part 110 and the second support part 130 are fully deployed, the cup may be received in the space between the first support part 110 and the second support part 130.

As is apparent from the above description, since the semi-automatic cup holder according to the embodiment of the present disclosure employs a structure in which the first support part and the second support part are deployed only when supporting a cup, the semi-automatic cup holder may be applied to an armrest having a small thickness. Further, a sufficient depth of a space in which the cup is received may be secured by the first support part and the second support part that are deployed, whereby the cup may be stably supported.

According to the embodiment of the present disclosure, when a user rotates any one of the first support part and the second support part along a manual section, the first support part and the second support part may continue to be rotated along an automatic section, with a result that the semi-automatic cup holder may enter a use state capable of receiving the cup or a non-use state. Therefore, the user may close or open the semi-automatic cup holder with little force.

Although the exemplary embodiments of the present disclosure have been described with reference to the accompanying drawings, it will be apparent to those skilled in the art that various changes in form and details may be made without departing from the technical spirit or essential characteristics of the disclosure set forth herein. Therefore, it should be understood that the above-described exemplary embodiments are illustrative in all aspects and do not limit the present disclosure.

What is claimed is:

1. A cup holder comprising:
   a first support part and a second support part configured to accommodate a cup and rotatably disposed to assume a non-use position or a use position;
   a first slider configured to be movable along a given axis by rotation of the first support part;
   a second slider configured to be movable along the given axis by rotation of the second support part; and
   a link spring connected to the first slider and the second slider and configured to be rotated when the first slider and the second slider are moved along the given axis,
   wherein the link spring is configured to be compressed as movement of the first slider and the second slider along the given axis is begun, and
   wherein the link spring is configured to expand after reaching a fully compressed state such that expansion of the link spring continues the movement of the first slider and the second slider along the given axis, and such that the first support part and the second support part are rotated by the expansion of the link spring to reach the use position or the non-use position.

2. The cup holder of claim 1, wherein as the link spring expands after being compressed, the first slider and the second slider are moved so as to approach each other, and the first support part and the second support part are fully deployed.

3. The cup holder of claim 2, wherein the first support part comprises a first concave portion formed therein so as to define a cup-receiving space,
   wherein the second support part comprises a second concave portion formed therein so as to further define the cup-receiving space, and
   wherein, when both the first support part and the second support part are fully deployed, the first concave portion and the second concave portion are positioned so as to face each other.

4. The cup holder of claim 1, wherein the link spring comprises:
   a central portion provided with a rotary shaft;
   a first connection portion connected to the first slider;
   a second connection portion connected to the second slider;
   a first spring connecting the central portion to the first connection portion; and
   a second spring connecting the central portion to the second connection portion.

5. The cup holder of claim 4, wherein, as the movement of the first slider and the second slider along the given axis is begun, the first spring and the second spring become compressed.

6. The cup holder of claim 1, wherein each of the first support part and the second support part is rotatable between the non-use position and the use position, and
   wherein a section between the non-use position and the use position is divided into a manual section and an automatic section.

7. The cup holder of claim 6, wherein, when one of the first support part and the second support part is rotated to a boundary between the manual section and the automatic section by manipulation by a user, the first slider and the second slider are moved along the given axis such that the link spring is compressed, and
   wherein the first slider and the second slider are further moved along the given axis due to an expansion of the link spring, and the first support part and the second support part are rotated through the automatic section.

8. The cup holder of claim 1, comprising a slider cover configured to cover the first slider, the second slider, and the link spring,
   wherein the slider cover comprises a restriction region configured to restrict a rotational range of the link spring.

9. The cup holder of claim 8, wherein the restriction region is a region protruding from or recessed in a surface of the slider cover facing the first slider and the second slider.

10. The cup holder of claim 8, wherein the restriction region is defined so as to restrict rotation of the link spring to an acute angle in each of clockwise and counterclockwise directions about an axis perpendicular to the given axis.

11. The cup holder of claim 8, wherein the slider cover comprises a first protruding portion and a second protruding portion protruding toward the first slider and the second slider and extending along the given axis,
   wherein the first protruding portion is configured to be inserted into a first recessed portion defined in the first slider and the first slider is configured to be moved along the first protruding portion, and
   wherein the second protruding portion is configured to be inserted into a second recessed portion defined in the second slider and the second slider is configured to be moved along the second protruding portion.

12. The cup holder of claim 1, comprising a body part to which the first support part and the second support part are connected,
   wherein the first support part and the second support part are disposed in an inner space defined by the body part, and
   wherein the first slider, the second slider, and the link spring are disposed on a sidewall of the body part defining one side of the body part.

13. The cup holder of claim 12, comprising:
   a first pin mounted on the first support part and extending through the sidewall of the body part and the first slider; and
   a second pin mounted on the second support part and extending through the sidewall of the body part and the second slider,
   wherein a first guide portion defining a movement path of the first pin revolving in the same direction as a rotational direction of the first support part and a second guide portion defining a movement path of the second pin revolving in the same direction as a rotational direction of the second support part are defined on the sidewall of the body part.

14. The cup holder of claim 13, wherein the first slider comprises a first slider guide portion defined therein,
   wherein the second slider comprises a second slider guide portion defined therein,
   wherein, when the first pin is moved in the first guide portion, the first pin is configured to apply force to the first slider while being moved in the first slider guide portion, whereby the first slider is moved along the given axis, and
   wherein, when the second pin is moved in the second guide portion, the second pin is configured to apply force to the second slider while being moved in the second slider guide portion, whereby the second slider is moved along the given axis.

15. The semi-automatic cup holder of claim 14, wherein the first guide portion and the second guide portion are defined so as to gradually approach respective ends of the body part in a direction from a lower portion of the body part to an upper portion of the body part,
   wherein the first slider guide portion and the second slider guide portion are defined so as to become gradually farther away from respective ends of the body part in the direction from the lower portion of the body part to the upper portion of the body part, and
   wherein the direction from the lower portion of the body part to the upper portion of the body part is a direction perpendicular to the given axis.

16. The cup holder of claim 1, wherein the link spring comprises a rotary shaft located between a first point at which the link spring is connected to the first slider and a second point at which the link spring is connected to the second slider.

17. A cup holder assembly comprising:
   a first support part and a second support part inserted into an armrest or a console and configured to be rotated in opposite directions by manipulation by a user to define a cup-receiving space;
   a first slider operably connected to the first support part and configured to be moved forward or backward along a given axis by rotation of the first support part, the given axis extending through the first support part and the second support part;
   a second slider operably connected to the second support part and configured to be moved forward or backward along the given axis by rotation of the second support part; and
   a link spring operably connected to the first slider and the second slider and configured to be rotated when the first slider and the second slider are moved along the given axis,
   wherein the first support part and the second support part are configured to be fully deployed and protrude above a surface of the armrest or a surface of the console in a course in which the link spring compressed by movement of the first slider and the second slider expands.

18. The cup holder assembly of claim 17, wherein the first support part and the second support part are configured to be rotated through a manual section within which the first support part and the second support part are moved by manipulation by a user and an automatic section within which the first support part and the second support part are automatically moved through expansion of the link spring,
   wherein, in the manual section, a user is to apply force in a given rotational direction in order to deploy the first support part and the second support part or to apply force in a rotational direction opposite the opposite the given rotational direction in order to store the first support part and the second support part, and
   wherein, when the first support part and the second support part are moved beyond a boundary between the manual section and the automatic section by manipulation by a user, the first support part and the second support part become fully deployed or fully retracted from expansion of the link spring.

19. The cup holder assembly of claim 18, wherein the boundary between the manual section and the automatic section corresponds to a state in which a reference axis interconnecting points at which the link spring is connected to the first slider and the second slider is oriented in a direction perpendicular to the given axis.

20. The cup holder assembly of claim 17, comprising:
a body part configured to form a space into which the first support part and the second support part are to be inserted; and
a slider cover configured to cover the first slider, the second slider, and the link spring disposed on a sidewall of the body part corresponding to one side of the body part,
wherein the slider cover comprises a restriction region configured to restrict a rotational range of the link spring.

* * * * *